United States Patent [19]
Goodman et al.

[11] Patent Number: 4,847,157
[45] Date of Patent: Jul. 11, 1989

[54] GLASS COATING METHOD AND RESULTING ARTICLE

[75] Inventors: Ronald D. Goodman, Toledo; William M. Greenberg, Oregon; Peter J. Tausch, Perrysburg, all of Ohio

[73] Assignee: Libbey-Owens-Ford Co., Toledo, Ohio

[21] Appl. No.: 87,789

[22] Filed: Aug. 25, 1987

Related U.S. Application Data

[63] Continuation-in-part of Ser. No. 901,282, Aug. 28, 1986, abandoned.

[51] Int. Cl.$^4$ .............................................. B32B 9/00
[52] U.S. Cl. ..................................... 428/426; 428/212; 428/216; 428/333; 428/428; 428/432; 428/433; 428/446; 428/448; 428/450; 428/457; 428/463; 428/704; 428/908.8; 428/913; 427/160
[58] Field of Search .............. 428/429, 447, 450, 702, 428/432, 448, 333, 539, 543, 426, 428, 434, 446, 457, 463, 908.8, 913, 213, 704, 212, 216, 472, 433; 427/160

[56] References Cited

U.S. PATENT DOCUMENTS

| | | | |
|---|---|---|---|
| 3,959,565 | 5/1976 | Jordan et al. | 428/702 |
| 4,100,330 | 7/1978 | Donley | 428/429 |
| 4,341,841 | 7/1982 | Ohno et al. | 428/426 |
| 4,535,000 | 8/1985 | Gordon | 427/160 |
| 4,584,236 | 4/1986 | Colman et al. | 428/702 |

Primary Examiner—Ellis P. Robinson
Assistant Examiner—Donald J. Loney
Attorney, Agent, or Firm—Marshall & Melhorn

[57] ABSTRACT

This disclosure is directed to a heat reflective glazing including a glass sheet having two generally planar parallel surfaces or sides with a multilayer coating on one of the side, and a method of producing such glazing. The side of the glass sheet having the multilayer coating thereon is designated as the film or coated side while the other side is designated as the glass side of the glass sheet. The multilayer coating comprises a first silicon-containing coating formed directly on the glass surface, a titanium nitride-containing coating overlying the first coating, a second silicon-containing coating covering the titanium nitride-containing coating, and an optional abrasion resistant coating, e.g., comprising tin oxide, on the second silicon-containing coating. The process for producing the coatings is a chemical vapor deposition process preferably carried out during the production of glass by the float process.

12 Claims, 1 Drawing Sheet

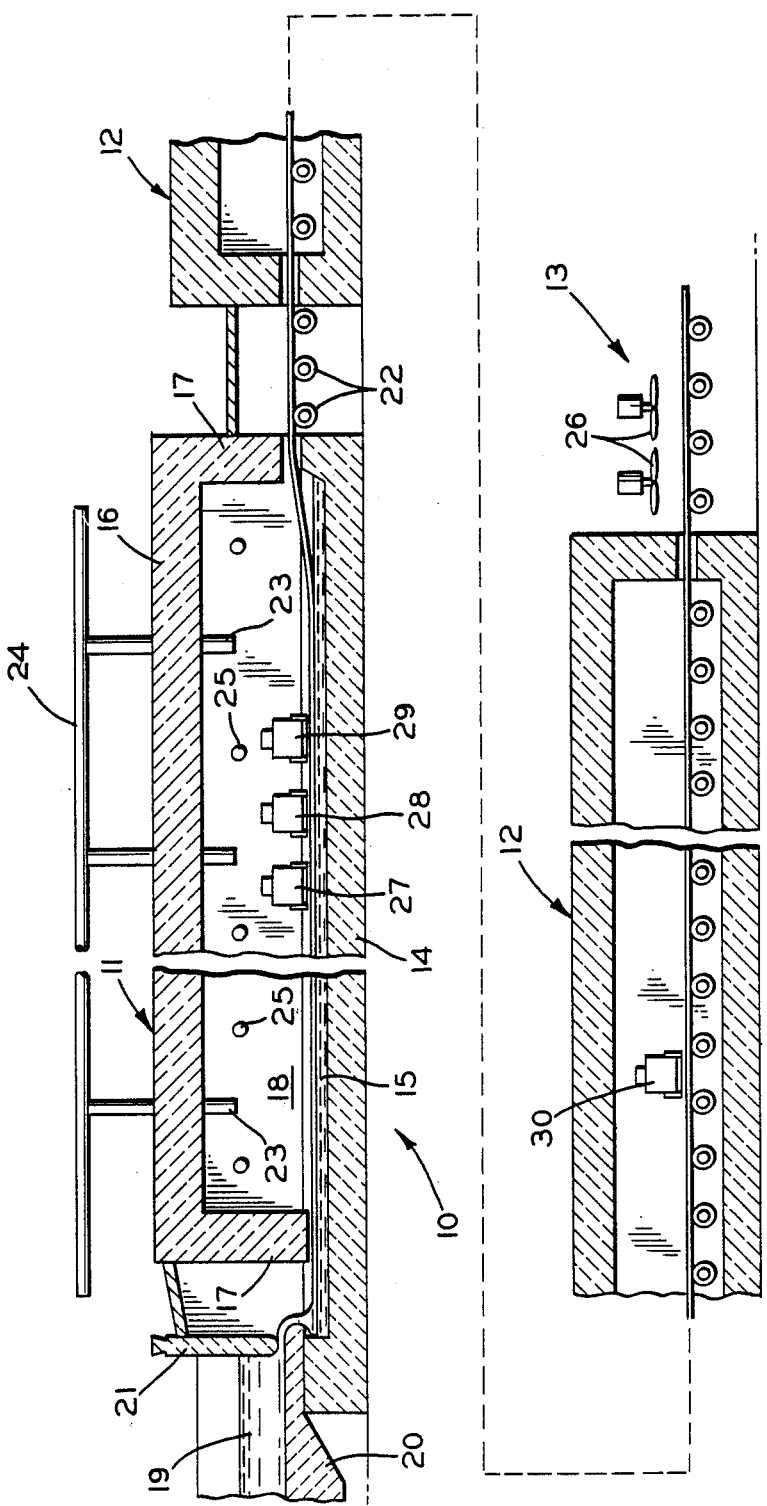
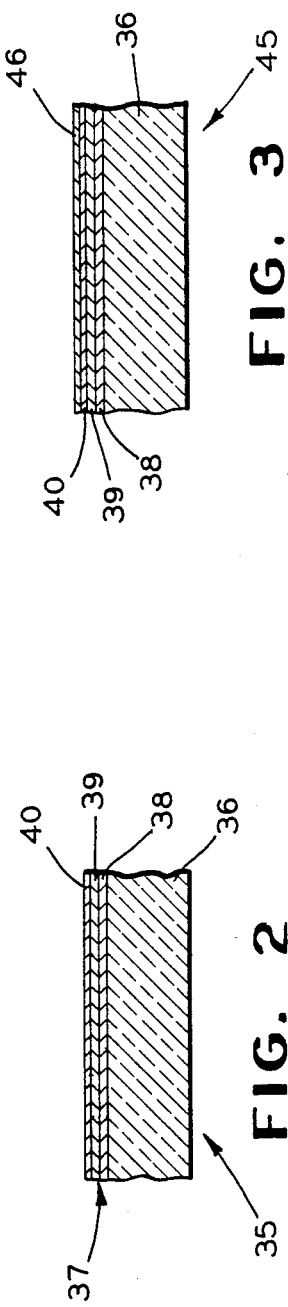

GLASS COATING METHOD AND RESULTING ARTICLE

CROSS REFERENCE TO RELATED APPLICATION

This application is a continuation-in-part of our application Ser. No. 901,282, filed Aug. 28, 1986, now abandoned.

BACKGROUND OF THE INVENTION

1. Field of the Invention

This invention relates to a continuous, chemical vapor deposition method for producing a coated glass article, particularly, coated heat reflective architectural glass, and to the coated article so produced. In a specific embodiment, the invention relates to such a method for producing a glass article coated with a layer of silicon formed by treatment with a non-oxidizing gas comprising mono-silane ($SiH_4$), and in some instances a mixture of mono-silane and ethylene ($C_2H_4$), a titanium nitride layer formed on the silicon layer by mixing a titanium tetrahalide, e.g., $TiCl_4$, with a reducing gas like ammonia and then reacting the gases at or near the surface of the silicon, and, on the titanium nitride layer, a second layer of silicon formed by treatment with a non-oxidizing gas comprising mono-silane or mono-silane and ethylene. The invention optionally includes the step of forming a protective layer, e.g., an abrasion resistant layer, on the second layer of silicon, which protective layer may comprise tin oxide.

2. The Prior Art

The production of architectural glass coated with silicon formed by continuous chemical treatment with a nonoxidizing gas comprising mono-silane is disclosed in U.S. Pat. No. 4,019,887, "Kirkbride et al.". The method disclosed by Kirkbride et al. is suitable for carrying out certain steps of the method of the instant invention, namely, that of forming a layer of silicon coating on a glass surface and on a titanium nitride coating.

The addition of ethylene to the Kirkbride et al. nonoxidizing gas comprising mono-silane is disclosed in U.S. Pat. No. 4,188,444 "Landau", as is a benefit derived from such use of ethylene, namely that the silicon coating has significantly improved resistance to alkali.

The use of ammonia and $TiCl_4$ mixtures to produce titanium nitride coatings on glass by chemical vapor deposition is disclosed in U.S. Pat. No. 4,535,000, "Gordon".

The production of a glass article having a surface coated with a layer of silicon produced by the method of Kirkbride et al. and additionally coated with a layer of a metal oxide, deposited on the silicon, is disclosed by U.S. Pat. No. 4,100,330 "Donley".

Most architectural glass is produced by the "Float Glass Process", a part of which is shown in the drawings of Kirkbride et al. This process involves casting glass onto a molten tin bath which is suitably enclosed, transferring the glass, after it cools sufficiently, to rolls that are aligned with the bath, and cooling the glass as it is advanced on the rolls, first through a lehr and, finally, while exposed to ambient conditions. A non-oxidizing atmosphere is maintained in the float portion of the process, in contact with the tin bath, to prevent oxidation, while an air atmosphere is maintained in the lehr.

It will be appreciated that it would be advantageous, when it is desired to coat glass with silicon and titanium nitride and subsequently with tin or another oxide, to do so in conjunction with the production thereof by the float glass process. The glass is at a suitable temperature, as is disclosed by Kirkbride et al. and Gordon, in the float portion of the process for treatment to apply a silicon coating and a titanium nitride coating. It is also at a suitable temperature in some parts of the lehr, which contains air, for treatment of a surface thereof with an oxidizing gas comprising tetramethyl tin to form a tin oxide coating.

THE INSTANT INVENTION

The present invention is based upon the discovery that a coated or filmed glass article having particular utility for glazing buildings in that the coating possesses a low emittance which enables it to be glazed to the inside of the building and still provide very beneficial solar properties, can be obtained with a structure including a glass substrate, a first silicon coating adhered to the glass substrate, a titanium nitride coating adhered to the silicon coating, a second silicon coating adhered to the titanium nitride coating, and an optional metal oxide coating adhered to the second silicon coating. The low emittance also provides better insulating capability than uncoated glass of equal composition and thickness. The overall heat transfer coefficient or U value of the glass, evaluated under winter time conditions, is significantly reduced with a low emittance coating facing the interior. For example, such coating with an emittance of 0.22 has a U value reduced by 30 percent, or a net heat savings of 21 Btu/hr./ft.$^2$ calculated for 70° F. inside and 0° F. outside for a single thickness of glass over uncoated glass.

BRIEF DESCRIPTION OF THE DRAWING

The novel features that are considered characteristic of the invention are set forth with particularity in the appended claims. The invention itself, however, both as to structure and method of manufacture, together with additional objects and advantages thereof, will best be understood from the following description of specific embodiments when read in connection with the accompanying drawing, in which:

FIG. 1 is a somewhat schematic view in vertical section of apparatus for practicing the float glass process which additionally includes four gas distributors suitably positioned to enable the practicing of the method of the instant invention;

FIG. 2 is a broken sectional view of a coated article according to this invention; and FIG. 3 is a broken sectional view illustrating another coated article of the invention.

DESCRIPTION OF THE PREFERRED EMBODIMENTS

Referring to the drawing, apparatus for practicing the float glass process, indicated generally at 10, comprises a float section 11, a lehr 12 and a cooling section 13. The float section 11 has a bottom 14 which contains a tin bath 15, a top 16, sidewalls (not illustrated) and walls 17 which form seals so that there is an enclosed zone 18 within which a non-oxidizing atmosphere is maintained, as subsequently described in more detail, to prevent oxidation of the tin bath 15.

In operation of the apparatus 10, molten glass, as indicated at 19, is cast onto a hearth 20, and flows therefrom under a metering wall 21 and downwardly onto the surface of the tin bath 15, from which it is picked up by rolls 22 and conveyed through the lehr 12 and the cooling section 13.

A non-oxidizing atmosphere is maintained in the float section 11 by introducing a suitable gas, for example, one composed of 99 percent by volume of nitrogen and 1 percent by volume of hydrogen, into the zone 18 through conduits 23 which are operably connected to a manifold 24. The gas is introduced into the zone 18 from the conduits 23 at a rate sufficient to make up for losses (some of the atmosphere leaves the zone 18 by flowing under the walls 17) and to maintain a slight positive pressure, say 0.001 to 0.01 atmosphere above ambient. The metal bath 15 and the enclosed zone 18 are heated by radiant heat directed downwardly from heaters 25. The atmosphere in the lehr 12 is air, while the cooling section is not enclosed, ambient air being blown onto the glass by fans 26.

The apparatus 10 also includes gas distributors 27, 28 and 29 in the float zone 11 and a gas distributor 30 in the lehr 12.

The following examples, which constitute the best mode presently contemplated by the inventors, are presented solely for the purpose of further illustrating and disclosing, and is not to be construed as a limitation on, the invention:

EXAMPLE I

The apparatus 10 was used to practice the method of the instant invention by producing coated float glass. Heat absorbing, green colored glass containing about 14 percent by weight of $Na_2O$, 73 percent by weight of $SiO_2$, 8.5 percent by weight of CaO, 0.48 percent by weight of $Fe_2O_3$, 0.18 percent by weight of $Al_2O_3$, 0.01 percent by weight of $TiO_2$, 4 percent by weight of MgO, and 0.001 percent by weight of $Co_3O_4$ was charged onto the hearth 20 and caused to flow onto the tin bath 15 as a sheet twelve feet (3.6 meters) wide and 3/16 inch (5 mm.) thick. The sheet was advanced through the apparatus 10 at a speed of about 27 feet (8.25 meters) per minute. The glass temperature was approximately 2000° F. (1093° C.) on the hearth 20. A non-oxidizing atmosphere was maintained in the zone 18 by introducing a gas thereinto from the conduits 23 to maintain a positive pressure above ambient of 0.006 atmosphere; the gas was composed of 99 percent by volume of nitrogen and 1 percent by volume of hydrogen. Nothing was done to control the atmosphere in the lehr 12; as a consequence, the oxidizing atmosphere therein was air. The glass was treated as it traveled under the distributor 27 by a gas composed of 90 volume percent of nitrogen and 10 volume percent of mono-silane; as it traveled under the distributor 28, by a gas composed of 6 volume percent titanium tetrachloride, 19 volume percent ammonia, and 75 volume percent nitrogen; and finally as it traveled under the distributor 29 by a gas composed of 95 volume percent nitrogen and 5 volume percent mono-silane. The glass advanced from the distributor 28 to the discharge end of the float zone 11 in from about 44 to 67 seconds. The glass temperature was 1200° F. (660° C.) under the distributor 28.

Upon lift out from the zone 18, the coated glass was conveyed into and through the lehr 12 and the cooling section 13 and exited from the latter at a temperature of approximately 100° F. (38° C.). The distributor 30 was not activated during travel of the glass sheet or ribbon through the lehr.

The article produced as described in the foregoing Example I is illustrated at 35 in FIG. 2 and comprises a glass substrate 36 and a multi-layer reflective coating 37 adhered to one surface thereof. The reflective coating 37 is composed of a silicon layer 38, 200 to 300 angstroms thick, on the glass; a titanium nitride layer 39, 900 to 1100 angstroms thick, on the silicon; and a second silicon layer 40, 100 to 200 angstroms thick on the titanium nitride and next to air. The coated glass was silver in reflection from the glass side and blue in reflection from the film side. The emissivity of the filmed surface was 0.25 to 0.38. The coated glass had a shading coefficient of 0.25 from the glass side, daylight or visible reflectance of 32 percent from the glass side, daylight or visible transmittance of 6.6 percent, and total solar transmittance of 4.5 percent. The article was post-temperable.

The procedure described in the foregoing Example I can also be used to coat gray and bronze heat absorbing glass as well as clear glass.

While the durability of the coated article of Example I is satisfactory for many applications, it has been found that a significant increase in abrasion and scratch resistance of the filmed surface can be obtained without significantly affecting the excellent optical properties of the article by providing a metal oxide layer, preferably tin oxide, adhered to and covering the second silicon coating.

EXAMPLE II

The process of Example I was repeated except that when the silicon-titanium nitride-silicon coated sheet was passed beneath the distributor 30 in the lehr 12, and was at a temperature of approximately 950°–1000° F. (510°–538° C.), such distributor was activated by a gas composed of 98.6 volume percent air and 1.4 volume percent of tetramethyl tin into contact with the coated sheet. The article produced in accordance with this Example II is illustrated at 45 in FIG. 3 and comprises, in addition to a first silicon layer 38, a titanium nitride layer 39 and a second silicon layer 40, a tin oxide layer 46 about 200 to 300 angstroms in thickness integrally adhered to and covering layer 40. The coated glass had a low purity blue to silver reflective color from both the glass and coating side. The emissivity of the filmed surface was 0.25 to 0.38. The shading coefficient was 0.25 from the glass surface and 0.28 from the filmed surface. The coated article had a visible reflectance of 32.5 percent from the glass side, a visible transmittance of 7.1 percent from the glass side and a total solar transmittance of 4.0 percent. The article was post-temperable and found to have excellent durability, e.g., scratch and abrasion resistance.

EXAMPLE III

The process of Example I was repeated except that when the glass traveled under the distributor 27 it was treated by a gas composed of 94 volume percent of nitrogen, 4 volume percent of mono-silane, and 2 volume percent ethylene; as it traveled under the distributor 28, by a gas composed of 1 volume percent titanium tetrachloride, 6 volume percent ammonia, and 93 volume percent helium (can use $N_2$ or other inert gas); and finally as it traveled under the distributor 29 by a gas composed of 95 volume percent nitrogen and 5 volume percent mono-silane. The glass advanced from the distributor 28 to the discharge end of the float zone 11 in from about 44 to 67 seconds. The glass temperature was 1200° F. (660° C.) under the distributor 28.

Upon lift out from the zone 18, the coated glass was conveyed into and through the lehr 12 and the cooling section 13 and exited from the latter at a temperature of approximately 100° F. (38° C.). The distributor 30 was not activated during travel of the glass sheet or ribbon through the lehr.

The article produced as described in the foregoing Example III comprises a glass substrate and a multilayer reflective coating adhered to one surface thereof. The reflective coating is composed of a silicon layer, 175 to 225 angstroms thick, on the glass; a titanium nitride layer, 650 to 750 angstroms thick, on the silicon; and a second silicon layer, 200 to 250 angstroms thick on the titanium nitride and next to air. The coated glass was muted rose in reflection, which is also the case if a clear glass substrate is employed rather than a heat absorbing glass. The coated glass had a total solar transmittance of 6.3 percent; a visible transmittance of 11.8 percent; total solar glass-side reflectance of 10.2 percent, and visible glass-side reflectance of 6.9 percent. The film had an emittance of 0.27; a shading coefficient of 0.28 measured from the glass side and 0.33 from the film side; and a U-value under winter time conditions of 0.81 Btu/hr.ft.$^2$ (uncoated glass has a U-value of 1.11 in the same thickness). The article was post-temperable.

While the precursor for the second silicon layer is noted above to the nitrogen and mono-silane, the same precursor as used to form the first silicon layer, including ethylene, can also be used if it is desired to increase the visible transmittance of the coating article.

EXAMPLE IV

The process of Example III was repeated except that when the silicon-titanium nitride-silicon coated sheet was passed beneath the distributor 30 in the lehr 12, and was at a temperature of approximately 950°-1000° F. (510°-538° C.), such distributor was activated to emit a gas composed of 98.6 volume percent air and 1.4 volume percent of tetramethyl tin. The article produced in accordance with this Example IV comprises in addition to the first silicon layer, a titanium nitride layer and a second silicon layer, a tin oxide layer about 200 to 300 angstroms in thickness integrally adhered to and covering the second silicon layer. The coated glass had a muted rose reflective color from both the glass and coating side. The emissivity of the filmed surface was 0.27. The shading coefficient was 0.28 from the glass surface and 0.33 from the filmed surface. The coated article had a total solar glass-side reflectance of 10.2 percent, a total solar transmittance of 6.3 percent and a visible glass-side reflectance of 6.9 percent. The article was post-temperable and found to have excellent durability, e.g., scratch and abrasion resistance.

It will be appreciated that various changes and modifications can be made from the specific details of the invention as incorporated in the foregoing Examples without departing from the spirit and scope thereof as defined in the appended claims. In its essential details, the invention is a continuous chemical vapor deposition method for producing a coated glass article. The method comprises the steps of continuously advancing the article, while hot, past first, second and third successive treating stations, and, optionally, a fourth treating station. The first three treating stations are in a closed zone in which a nonoxidizing atmosphere is maintained. An oxidizing atmosphere is maintained in the vicinity of the optional fourth treating station. In the foregoing examples, the non-oxidizing atmosphere in the enclosed zone in which the first three treating stations are positioned was maintained by introducing thereinto a gas composed of 99 percent by volume of nitrogen and 1 percent by volume of hydrogen. As is apparent from the results achieved by practicing the process of Examples I, II, III and IV such an atmosphere is entirely suitable. However, other inert gases could be substituted for the nitrogen, and the proportion of hydrogen could be increased or decreased, so long as the necessary result is achieved, namely, oxidation of the tin bath is prevented and silicon and titanium nitride coatings can be applied to the glass substrate. Similarly, in the method of Examples II and IV, air was used to provide an oxidizing atmosphere in the lehr 12, but other oxidizing atmospheres can also be employed for example, air enriched with either hydrogen or nitrogen, or even one containing an inert gas other than nitrogen, so long as the required result of deposition of a tin or other oxide coating is achieved without undue detriment to the lehr itself.

In practicing the instant invention, a non-oxidizing gas which contains a silane is directed against a surface of the article to form a first silicon coating on that surface and against the titanium nitride layer to form the second silicon layer. In the foregoing Examples, the silane was mono-silane ($SiH_4$). However, the treating gas can contain other silanes, in addition to mono-silane, or in place thereof. Examples of other silanes that can be used include monochlorosilane ($ClSiH_3$), dichlorosilane ($Cl_2SiH_2$), other halosilanes, alkoxysilanes and di-tri-and higher silanes. Organosilanes, e.g., methyltrichlorosilane, are less desirable reactants than the silanes mentioned above, because it is difficult to break the silicon-to-carbon bond to form the desired silicon coating. Mono-silane is the presently preferred treating agent for reasons of cost and availability and because the by-product of its use (hydrogen) does not constitute an ecological problem (contrast the chlorosilanes mentioned above, where the by-product is hydrogen chloride).

In accordance with a preferred embodiment of the invention, a quantity of an olefin, e.g., ethylene, is added to the silane. The addition of ethylene ($C_2H_4$) to monosilane provides distinct advantages for the base and top silicon layers. Small amounts of ethylene added to the monosilane which reacts to form the base layer changes the optical properties such that increases in visible light transmittance can occur without significantly affecting the shading coefficient. Also, the incidence and size of pinholes formed when the titanium nitride is created over the base silicon layer is greatly reduced with small additions of ethylene to the base layer. Addition of ethylene to the mono-silane creating the top layer also increases the visible light transmittance of the film stack.

The titanium nitride layer was formed in the Examples by directing a gas containing titanium tetrachloride and ammonia in an inert carrier against the first silicon coating. Typical concentrations of the mixed gases range from 0.5 to 10 mole percent titanium tetrachloride and 3 to 50 (preferably 5-30) mole percent ammonia.

The base silicon layer can have oxygen incorporated therein as a transition layer between the glass substrate and the silicon layer. This transition layer is not purposely formed but may inherently result from the process of laying down the silicon layer on the hot glass in the manner described herein. Further, the body of the elemental silicon base layer can have trace amounts of carbon, hydrogen and oxygen where the precursor includes ethylene as well as monosilane. Similarly, the titanium nitride layer may have incorporated in it carbon, chlorine, and oxygen, as well as traces of other elements from either the precursor materials or the silicon coatings on either side thereof. The second silicon layer, in addition to possibly containing trace amounts of carbon, hydrogen and oxygen throughout, particularly where the precursor includes ethylene, may have a surface oxide film formed thereon upon lift-out from the bath and during travel through the lehr. This surface oxide layer, when present, has been found to inhibit the formation of pin holes in the coated article where a subsequent layer such as tin oxide is formed over the second silicon layer. Thus, while the compositions of the layers are identified herein and in the appended claims as silicon and titanium nitride, it should be understood that these terms are defined to include within their scope the trace elements and transition layers discussed above.

The composition of the base or substrate glass does not structurally or chemically affect the composition of the coatings deposited therein, but does affect the final performance of the product because of different solar absorption characteristics for the different types of glasses. The different colors of glass—clear, blue-green, grey, and bronze—absorb differently in the visible and infrared regions of the solar spectrum and change both the appearance and performance of the product. Other glass compositions would affect these traits also.

The procedure of the foregoing Examples II and IV, involved the treatment of the coated glass 35 in the lehr with a gas composed of 98.6 volume percent of air and 1.4 volume percent of tetramethyl tin, directed onto the glass from the distributor 30. The purpose of this treatment was to form a tin oxide coating over the silicon-titanium nitride-silicon layers that previously had been formed. An oxidizing atmosphere is required to enable tetramethyl tin to deposit a tin oxide coating. Air is a convenient oxidizing gas to use for this purpose, but air enriched with either oxygen or nitrogen or even another inert gas could be substituted for the air. A mixture of more than about 1.6 volume percent of tetramethyl tin in air is flammable and, therefore, should be avoided. Other tin compounds can be substituted for tetramethyl tin, for example, stannic chloride and various organo tin compounds that are available. Indeed, other metal oxides can be employed, for example, titanium oxide coatings can be applied over the silicon-titanium nitride-silicon layers, for example, using titanium tetrachloride; alumina coatings, for example using diethyl aluminum chloride; silica coatings, for example using oxide/boron oxide/aluminum oxide coatings from mixtures of titanium tetrachloride, boron hydride and diethyl aluminum chloride.

In the foregoing examples, the glass temperature at the distributors 27, 28 and 29 was 1200°±100° F. (649°±55° C.) and 970°±20° F. (521°±11° C.) under the gas distributor 30. The residence time of the glass in the oxidizing atmosphere (air) of the lehr 12 before it was treated with the air-tetramethyl tin gas from the distributor 30, was about 6 minutes.

In general, the coated glass articles in accordance with this invention comprise a glass substrate, a first silicon coating about 100 to 400 angstroms in thickness adhered to a surface of the substrate, a titanium nitride coating about 500 to 1200 angstroms in thickness adhered to the first silicon coating, a second silicon coating about 100 to 400 angstroms thick adhered to the titanium nitride coating, and an optional metal oxide coating adhered to the second silicon coating. Preferably, the metal oxide coating, if present, comprises tin oxide and is about 150 angstroms to 300 angstroms in thickness.

The coated articles have a visible light transmittance less than 15 percent and a shading coefficient measured on both the glass side and the coating side of less than 0.35, preferably in the range of 0.23 to 0.32, with that measured on the glass side being lower than that measured on the coating side. A particularly advantageous glazing in accordance with the invention and including a tin oxide coating adhered to the second silicon coating, comprises first and second silicon coatings 150 to 300 angstroms in thickness, and a titanium nitride coating 600 to 1100 angstroms thick, with the tin oxide coating being in the range of 150 angstroms to 250 angstroms in thickness. This glazing has a visible light transmittance in the range of 5 to 12 percent and a shading coefficient measured on the glass side in the range of 0.23 to 0.28 and on the coating side in the range of 0.26 to 0.31, but in all events higher than on the glass side.

Other changes and modifications from the specific details of the invention as disclosed above will be apparent to those skilled in the art and can be made without departing from the spirit and scope thereof if within the definitions of the appended claims.

What is claimed is:

1. A coated article comprising a glass substrate;
   a first silicon coating adhered to the glass substrate,
   a titanium nitride coating adhered to the silicon coating,
   a second silicon coating adhered to the titanium nitride coating, and
   an optional method oxide coating adhered to the second silicon coating.

2. A coated glass article as defined in claim 1, in which the shading coefficient measured on both the glass side and coating side is less than 0.35 and the visible light transmittance is less than 15 percent.

3. A coated glass article as defined in claim 1, in which the shading coefficient measured on both the glass side and the coating side is in the range of 0.23 to 0.35, with that measured on the glass side being lower than that measured on the coating side.

4. A coated article comprising a glass substrate;
   a first silicon coating about 100 to 400 angstroms in thickness and adhered to the glass substrate,
   a titanium nitride coating about 500 to 1200 angstroms in thickness and adhered to the first silicon coating,
   a second silicon coating about 100 to 400 angstroms in thickness adhered to the titanium nitride coating, and
   an optional tin oxide coating adhered to the second silicon coating.

5. A coated article as defined in claim 4, including a tin oxide coating adhered to the second silicon coating, in which the tin oxide coating is about 150 to 300 angstroms in thickness.

6. A coated article as defined in claim 4, in which the shading coefficient measured on the glass side is in the range of 0.23 to 0.28 and on the coating side is in the range of 0.26 to 0.31 but in all events higher than on the glass side, and the visible light transmittance of the article is about 5 to 10 percent.

7. A coated article as defined in claim 6, including a tin oxide coating adhered to the second silicon coating, in which the first silicon coating is about 150 to 300 angstroms in thickness, the titanium nitride coating is about 600 to 1100 angstroms in thickness, the second silicon coating is about 150 to 300 angstroms in thickness, and the tin oxide coating is about 150 to 250 angstroms in thickness, said article having a low purity blue to silver reflective color from both the glass and coating side.

8. A coated article comprising a glass substrate;
   a first silicon coating about 150 to 300 angstroms in thickness and adhered to the glass substrate,
   a titanium nitride coating about 500 to 1200 angstroms in thickness and adhered to the first silicon coatings, and
   a second silicon coating about 150 to 300 angstroms in thickness and adhered to the titanium nitride coating.

9. A coated glass article as defined in claim 1, wherein the emittance on the coated side of the article is 0.22 to 0.38, and the calculated U value when the article is glazed in a building with the coated side facing the interior thereof is a much 30 percent lower compared to single glazing uncoated glass of the same composition and thickness under winter time conditions.

10. A coated glass article comprising a glass substrate;
    a first silicon coating adhered to the glass substrate;
    a titanium nitride coating adhered to said first coating;
    a second silicon coating adhered to the titanium nitride coating; and
    an optional abrasion resistant metal oxide coating adhered top said second silicon coating, said article having a shading coefficient measured on both the glass side and the coating side of less than 0.35 and a visible light transmittance of less than 15 percent.

11. A coated glass article as defined in claim 10, in which the shading coefficient measured on both the glass side and the coating side is in the range of 0.23 to 0.35, with that measured on the glass side being lower than that measured on the coating side.

12. A coated glass article as defined in claim 10, in which the emissivity of the coated side is in the range of 0.22 to 0.38.

* * * * *

UNITED STATES PATENT AND TRADEMARK OFFICE
CERTIFICATE OF CORRECTION

PATENT NO. : 4,847,157

DATED : July 11, 1989

INVENTOR(S) : Ronald D. Goodman, et. al

It is certified that error appears in the above-identified patent and that said Letters Patent is hereby corrected as shown below:

Column 5, line 32, "coating" should read —coated—.

Column 6, line 18, "hydrogen" should read —oxygen—.

In the claims:

Claim 1, line 7, "method" should read —metal—.

Signed and Sealed this

Thirty-first Day of December, 1991

*Attest:*

HARRY F. MANBECK, JR.

*Attesting Officer*      *Commissioner of Patents and Trademarks*